United States Patent
Annangi et al.

(10) Patent No.: US 12,511,886 B2
(45) Date of Patent: Dec. 30, 2025

(54) SELF-SUPERVISED LEARNING FRAMEWORK TO GENERATE CONTEXT SPECIFIC PRETRAINED MODELS

(71) Applicant: GE Precision Healthcare LLC, Wauwatosa, WI (US)

(72) Inventors: Pavan Annangi, Bangalore (IN); Deepa Anand, Bangalore (IN); Bhushan Patil, Pune (IN); Rahul Venkataramani, Bangalore (IN)

(73) Assignee: GE Precision Healthcare LLC, Wauwatosa, WI (US)

( * ) Notice: Subject to any disclaimer, the term of this patent is extended or adjusted under 35 U.S.C. 154(b) by 634 days.

(21) Appl. No.: 17/889,201

(22) Filed: Aug. 16, 2022

(65) Prior Publication Data

US 2023/0052078 A1 Feb. 16, 2023

(51) Int. Cl.
| | |
|---|---|
| *G06K 9/00* | (2022.01) |
| *G06V 10/20* | (2022.01) |
| *G06V 10/26* | (2022.01) |
| *G06V 10/778* | (2022.01) |
| *G16H 30/40* | (2018.01) |

(52) U.S. Cl.
CPC .......... *G06V 10/778* (2022.01); *G06V 10/255* (2022.01); *G06V 10/26* (2022.01); *G16H 30/40* (2018.01); *G06T 2207/10132* (2013.01)

(58) Field of Classification Search
CPC .... G06V 10/778; G06V 10/26; G06V 10/255; G16H 30/40; G06T 2207/10132
See application file for complete search history.

(56) References Cited

U.S. PATENT DOCUMENTS

| | | | |
|---|---|---|---|
| 11,386,302 B2* | 7/2022 | Chen | G06F 18/2155 |
| 11,960,572 B2* | 4/2024 | Chopde | G06F 18/40 |
| 2021/0150710 A1* | 5/2021 | Hosseinzadeh Taher | G06V 10/764 |
| 2021/0327029 A1* | 10/2021 | Chen | G06T 5/70 |
| 2021/0343014 A1* | 11/2021 | Haghighi | G06V 10/82 |
| 2021/0374239 A1* | 12/2021 | Harang | G06F 21/566 |
| 2022/0309811 A1* | 9/2022 | Haghighi | G06V 10/764 |
| 2022/0328189 A1* | 10/2022 | Zhou | G06V 10/82 |
| 2023/0016472 A1* | 1/2023 | Nguyen | G06V 20/69 |
| 2023/0196642 A1* | 6/2023 | Hosseinzadeh Taher | G06T 7/0012 382/128 |
| 2023/0274538 A1* | 8/2023 | Sia | G06V 10/82 382/155 |

(Continued)

OTHER PUBLICATIONS

Jaiswal, Ashish, et al. "A survey on contrastive self-supervised learning." Technologies 9.1 (2020): 2. (Year: 2020).*

(Continued)

*Primary Examiner* — Avinash Yentrapati

(57) ABSTRACT

Systems and methods for self-supervised representation learning as a means to generate context-specific pretrained models include selecting data from a set of available data sets; selecting a pretext task from domain specific pretext tasks; selecting a target problem specific network architecture based on a user selection from available choices or any customized model as per user preference; and generating a pretrained model for the selected network architecture using the selected data obtained from the set of available data sets and a pretext task as obtained from domain specific pretext tasks.

20 Claims, 7 Drawing Sheets

(56) References Cited

U.S. PATENT DOCUMENTS

2023/0281959 A1* 9/2023 Hoshen .................. G06N 3/045
382/225

OTHER PUBLICATIONS

Reed et al., "Self-Supervised Pretraining Improves Self-Supervised Pretraining." arXiv preprint arXiv:2103.12718. Mar. 23, 2021, (v1), 22 pages.

Zhou et al., "Models genesis: Generic autodidactic models for 3d medical image analysis." In International Conference on Medical Image Computing and Computer-Assisted Intervention (pp. 384-393). Springer, Cham., Oct. 2019, 27 pages.

* cited by examiner

SELF-SUPERVISED LEARNING FRAMEWORK TO GENERATE CONTEXT SPECIFIC PRETRAINED MODELS

PRIORITY

This application is based on and claims priority to Indian Patent Application No. 202141037094, filed on Aug. 16, 2021 in the Indian Patent Office, the disclosure of which is incorporated herein by reference in its entirety.

TECHNICAL FIELD OF THE INVENTION

This application relates to the field of image processing using artificial intelligence based deep learning modules, and more particularly to systems and methods to provide a framework based on self-supervised representation learning for custom built pretrained model generation for medical imaging tasks on demand.

BACKGROUND OF THE INVENTION

Hospitals, doctors and paramedical staff are increasingly relying on digitally obtaining, processing, storing and retrieving the medical records of a subject patient. These medical records are generated during investigations of the subject include a variety of imaging techniques like pathology reports, scanning using various medical imaging systems like ultrasound, magnetic resonance imaging, computed tomography systems and other radiological investigations. These medical records generated from various investigations may be stored in different formats, for example, the medical images will be stored in a format popularly known as DICOM that is different than the format for storing the pathology report. For faster and accurate identification and analysis of the features within an image, artificial intelligence based deep learning techniques are widely employed.

Deep learning is a class of machine learning techniques employing representation learning methods that allows a machine to be given raw data and determine the representations needed for data classification. Deep learning ascertains structure in data sets using backpropagation algorithms. Deep learning machines may utilize a variety of multilayer architectures and algorithms. While machine learning, for example, involves an identification of features to be used in training the network, deep learning may process raw data to identify features of interest without the external identification. The raw data may be an image data or a video data obtained using medical imaging techniques like ultrasound, X-ray, computed tomography (CT), and magnetic resonance imaging (MM).

Deep learning in a neural network environment includes numerous interconnected nodes referred to as neurons. Input neurons, activated from an outside source, activate other neurons based on connections to these other neurons which are governed by the machine operating conditions. A neural network behaves in a certain manner based on its own sequences. Learning refines the machine output, and the connections between neurons in the network such that the neural network behaves in a desired manner. Deep learning that utilizes a convolutional neural network segments data using convolutional filters to locate and identify learned, observable features in the data. Each filter or layer of the convolution neural network (CNN) architecture transforms the input data to increase the selectivity and invariance of the data. This abstraction of the data allows the machine to focus on the features in the data that the machine attempts to classify and ignore irrelevant background information.

Deep learning operates on the understanding that many datasets include high level features and low-level features. At high level, while examining an image, for example includes, rather than looking for an object, it is more efficient to look for edges which form motifs which form parts, which form the object being sought. These hierarchies of features may be found in many different forms of data such as video data, image data, speech and text, etc. Learned observable features include objects and quantifiable regularities learned by the machine during supervised learning. A machine provided with a large set of well classified data is better equipped to distinguish and extract the features in successful classification of new data than the traditional algorithms that are not continuously trained to classify the data. However, the large data set may not be available every time for increasing the accuracy of the training or the data set may be from a different imaging modality or the available image data is from a machine having a different resolution or the data set may be small.

The best-case scenario for any deep learning task is to have a pretrained model that is trained on a similar imaging modality and anatomy, that performs similar task (identification, segmentation) and the training images have similar architecture (2 dimensional or 3 dimensional). However, for the combination of tasks (segmentation/regression/classification) and architectures (video/3D etc), one may not have readily available pretrained models. So often the choice of networks and pretrained weights limit the solution space and models trained on generic data such as Imagenet models and standard network architectures are routinely used for model development.

An example deep learning neural network may be trained on a set of expert classified data, for example. This set of data builds the neural network and is the stage of supervised learning. During the stage of supervised learning, the neural network may be tested whether the desired behavior has been achieved. Once a desired neural network behavior has been achieved (e.g., a machine has been trained to operate according to a specified threshold, etc.), the machine may be deployed for use (e.g., testing the machine with "real" data, etc.). During operation, neural network classifications may be confirmed or denied (e.g., by an expert user, expert system, reference database, etc.) to continue improving neural network behavior.

Deep learning machines may provide computer aided detection support to improve their image analysis with respect to image quality and classification, for example. However, issues faced by deep learning machines when applied to the medical field often lead to numerous false classifications. For example, deep learning machines need to overcome small training datasets and repetitive adjustments.

Deep learning (DL) models are used in medical image processing and analysis tasks like organ segmentation, anomaly detection, image reconstruction, and so on. Most often these models are trained on specific type of source domain images (non-contrast or contrast, specific field-of-view (FOV), dosage, demography, etc.). It is desirable to re-use/re-purpose these models for a different but similar target domain. However, it is difficult to adapt these models to accurately perform on another domain for which little or no ground truth training data is available. Therefore, it is desirable to provide for self-supervised learning framework to generate context specific pretrained models with very little or no ground truth data.

SUMMARY OF THE INVENTION

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are described that facilitate domain adaptation of image processing models.

In accordance with an aspect of the disclosure, a method for self-supervised representation learning as a means to generate context-specific pretrained models may include selecting data from a set of available data sets; selecting a pretext task from domain specific pretext tasks; selecting a target problem specific network architecture based on a user selection from available choices or any customized model as per user preference; and generating a pretrained model for the selected network architecture using the selected data obtained from the set of available data sets and a pretext task as obtained from domain specific pretext tasks.

In accordance with an aspect of the disclosure, a system for self-supervised representation learning as a means to generate context-specific pretrained models may include at least one medical imaging device configured to acquire a plurality of medical images to generate at least one data set; a computer memory configured to store the data sets and computer executable programs configured to carry out data set selection, pretext task selection and problem specific network architecture; a computer processor comprising executable computer programs and configured to select data from a set of available data sets; to select a pretext task from domain specific pretext tasks and select a problem specific network architecture based on a user selection from available choices or any customized model as per user preference; and to generate a pretrained model for the selected network architecture using the selected data obtained from the set of available data sets and a pretext task as obtained from domain specific pretext tasks.

In some embodiments, elements described in the disclosed systems can be embodied in different forms such as a computer-implemented method, a computer program product, or another form.

DESCRIPTION OF THE DRAWINGS OF THE INVENTION

FIG. 4 (b) illustrates edge-based object detection of an image 4 (a) using Frangi vesselness filter in ultrasound images in accordance with an aspect of the disclosure.

DETAILED DESCRIPTION

Figure 1:
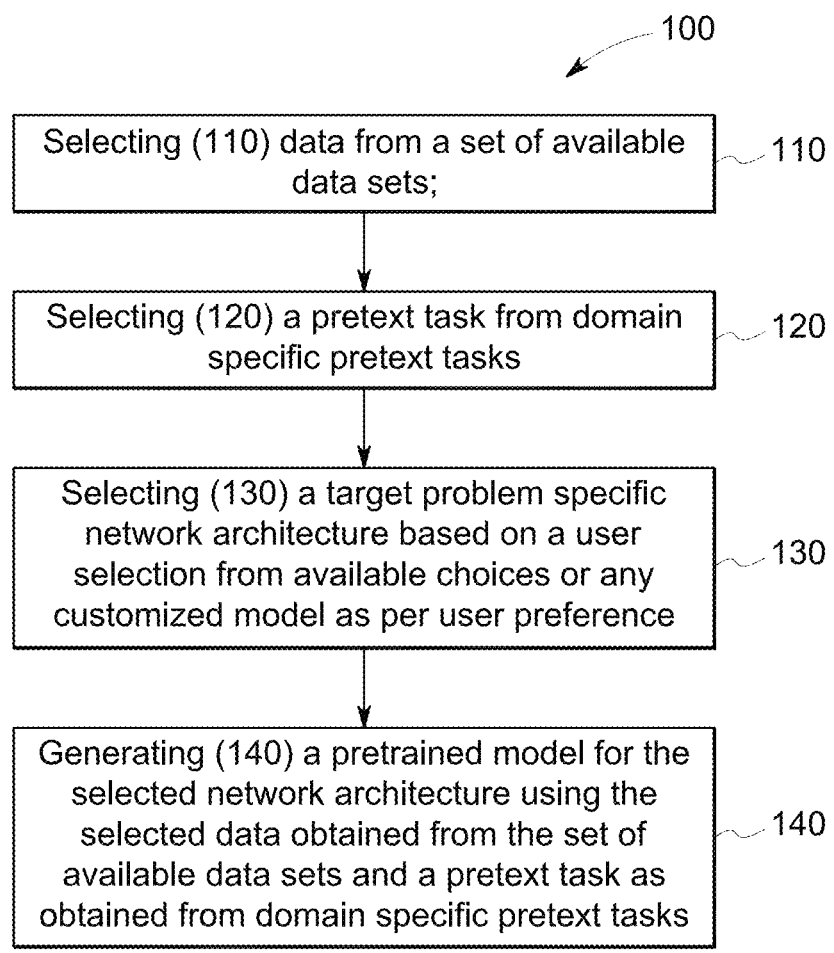
FIG. 1 illustrates a method for self-supervised representation learning as a means to generate context-specific pretrained models in accordance with an aspect of the disclosure.

The following detailed description is merely illustrative and is not intended to limit embodiments and/or application or uses of embodiments. Furthermore, there is no intention to be bound by any expressed or implied information presented in the preceding Summary section or in the Detailed Description section.

In the following specification and the claims, reference will be made to a number of terms, which shall be defined to have the following meanings.

The singular forms "a", "an", and "the" include plural references unless the context clearly dictates otherwise.

As used herein, the terms "software" and "firmware" are interchangeable and include any computer program stored in memory for execution by devices that include, without limitation, mobile devices, clusters, personal computers, workstations, clients, and servers.

As used herein, the term "computer" and related terms, e.g., "computing device", "computer system" "processor", "controller" are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "systems", "devices" and "apparatuses are interchangeable and include components, sub-components, sub-systems that include without limitation the medical imaging devices.

In accordance with an aspect of the disclosure a method is disclosed, particularly a method for self-supervised representation learning as a means to generate context-specific pretrained models is disclosed. The method may include selecting data from a set of available data sets. The method may further include selecting a pretext task from domain specific pretext tasks. The method may further include selecting a target problem specific network architecture based on a user selection from available choices or any customized model as per user preference. The method may include generating a pretrained model for the selected network architecture using the selected data obtained from the set of available data sets and a pretext task as obtained from domain specific pretext tasks.

In accordance with an aspect of the disclosure a system is disclosed particularly a system for self-supervised representation learning as a means to generate context-specific pretrained models is disclosed. The system may include at least one medical imaging device configured to acquire a plurality of medical images to generate at least one data set. The system may further include a computer memory configured to store the data sets and computer executable programs configured to carry out data set selection, pretext task selection and problem specific network architecture. The system may further include a computer processor including executable computer programs and configured to select data from a set of available data sets. The computer processor may be further configured to select a pretext task from domain specific pretext tasks and select a problem specific network architecture based on a user selection from available choices or any customized model as per user preference. The computer processor may be further configured to generate a pretrained model for the selected network architecture using the selected data obtained from the set of available data sets and a pretext task as obtained from domain specific pretext tasks.

Embodiments of the present disclosure will now be described, by way of example, with reference to the figures. The deep learning or machine learning models used in the field of artificial intelligence are developed using pretrained models. If the model weights of the pretrained model are pre-trained on data similar in distribution to the target problem and related task, the model may give superior results than a generic model pre-trained on publicly available image databases like ImageNet or coco databases. Some of the desirable properties offered by model pretraining include robustness of model, faster convergence and improved accuracy of the model with minimum supervision. However, due to unavailability of sufficient training data or divergence of the dataset from the target data (change in modality, image resolution, age of the subject etc.) the data may not be sufficient to train the model. Also, for the combination of tasks (segmentation/regression/classification) and architectures (video/3D etc.), one may not have readily available pretrained models, and often the choice of networks and pretrained weights limit the solution space. In such cases, models trained on generic data such as Imagenet models and standard network architectures are routinely used for model development.

The utility of pretrained models to build deep learning solutions across anatomies and for different modalities is well studied and some of the advantages offered by model pretraining may include model robustness, faster convergence and improved accuracy with minimal supervision. More specifically, model weights pre-trained on data similar in distribution to the target problem give superior results than a generic model pre-trained on publicly available image databases like ImageNet or coco databases. In addition, it is often not possible to get pretrained weights on desired network architecture including handcrafted networks and most available pretrained models are available on standard network architectures like VGGNet, AlexNet, Resnet etc.

The best-case scenario for any deep learning task is to have a pretrained model that is trained on (a) similar modality and anatomy (b) similar task (c) any desired architecture. However, for the combination of different tasks like segmentation or regression or classification of anatomies and architectures (video or three dimensional), one may not have readily available pretrained models. Accordingly, the choice of networks and pretrained weights limit the solution space and models trained on generic data such as Imagenet models and standard network architectures are routinely used for model development. In accordance with an aspect of the disclosure a framework is described based on self-supervised representation learning for 'custom built pretrained model generation' for medical imaging tasks as desired.

In accordance with an aspect of the disclosure, a method 100 is disclosed for a platform solution to design context (task, anatomy, architecture) specific self-supervised model training and generate a pretrained model for the target task. The method 100 may comprise selecting 110 data from a set of available data sets. Selecting 110 data from a set of available data sets may comprise identifying the data that is similar to the available data or the target data. This data selection may be a perceptual similarity-based approach of selecting the data. In another aspect, DICOM metadata may be used to generate the additional training data for the training model. In one example, this DICOM metadata may include two dimensional or three-dimensional image data of the similar organ obtained at a different acquisition setting. In another example, the selecting 110 data may include acquiring image data from similar anatomical organ or anatomical region as the target data.

In accordance with an aspect of the disclosure, the method 100 enables designing a context (task, anatomy, architecture) appropriate self-supervised model training and generating a pretrained model for the target task. The method 100 may build a pretrained model based on the algorithms. For a given anatomy and imaging modality, following algorithms may be used: (a) an algorithm to identify similar images from the database by a combination of perceptual loss-based similarity and rule-based algorithm. (b) for a given task, (for example: segmentation), a pretext task that may be selected from domain specific pretext tasks. (c) Select a problem specific network architecture based on the user selection from available choices or any customized model as per user preference. Now a pretrained model may be generated for the network architecture chosen in selecting a problem specific network architecture based on the user selection from available choices (step (c) above) using the data obtained from step (a) and a pretext task as obtained from step (b). In accordance with an aspect of the disclosure, a method 100 for automatic customized design of experiment to generate a pretrained model using self-supervision based on a target task—posed as a query. Self-supervised tasks may be pooled of self-supervision tasks: both generic and domain specific. In addition, there may exist a pool of datasets covering different anatomy and modalities. An array of architectures suitable for different tasks, such as classification, segmentation etc. may also be available. Depending on the mode of deployment, an appropriate choice of architecture might be required. For instance, models to be deployed on low compute edge devices may impose an additional restriction on model size and network depth. Each of the pretext tasks, datasets and architectures may be tagged with one or more keywords describing them. For instance, a pretext task may be either suitable for image, video or text. Similarly, a dataset may be tagged by the anatomy or modality etc. The assignment of keywords to the various entities would aid in the selection process according to the required criteria.

Figure 2:
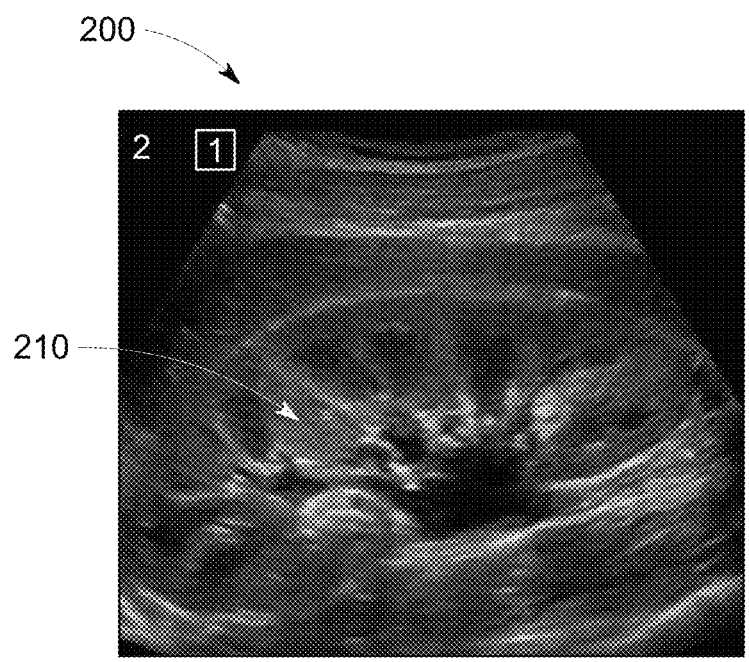
FIG. 2 illustrates an ultrasound image of kidney for obtaining the data related to segmentation of kidney region in accordance with an aspect of the disclosure.

In one example FIG. 2 shows an ultrasound image of kidney 200 for obtaining the data related to segmentation of kidney region 210. An anatomical organ manifested as a bright boundary edges with heterogeneous echogenic interiors like fetal abdomen, uterus may be utilized as it has similar echogenicity as kidney region 210. In similar example, the objects defined by highly echogenic boundaries with hypo or mixed echogenic regions include kidney, fetal head, fetal abdomen, fetal femur, spine, uterus, or ovary.

Figure 3:
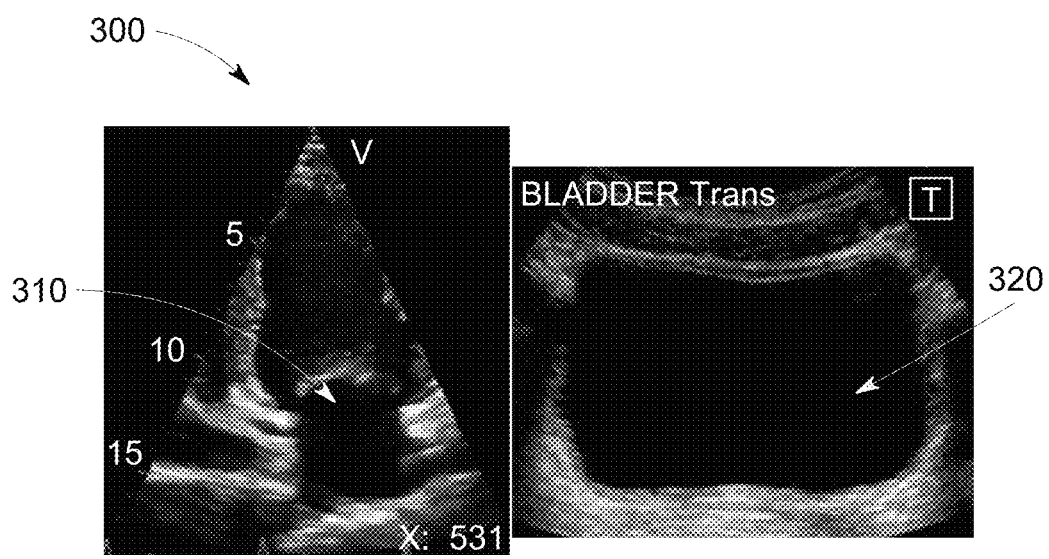
FIG. 3 illustrates chamber segmentation of a bladder in accordance with an aspect of the disclosure.

In another example as shown in FIG. 3, for a chamber segmentation problem of bladder 300, the ideal pretraining data can be taken from other similar looking organs like bladder 310, gall bladder 320 etc. Other organs with bright boundaries similar to bladder may include lesions, cysts, cardiac chambers, aorta, gall bladder, bladder, and follicles. Image data of these organs may be used to train the models for other similar target organs. In another example, images of the organs having vessel structures may be used as the training data set. Such vessel like structures may include outflow tracts, portal vein or carotid. In further example, organs like liver and spleen have homogeneous structure and image data from these organs may be used to train the deep learning models.

Figure 4B:
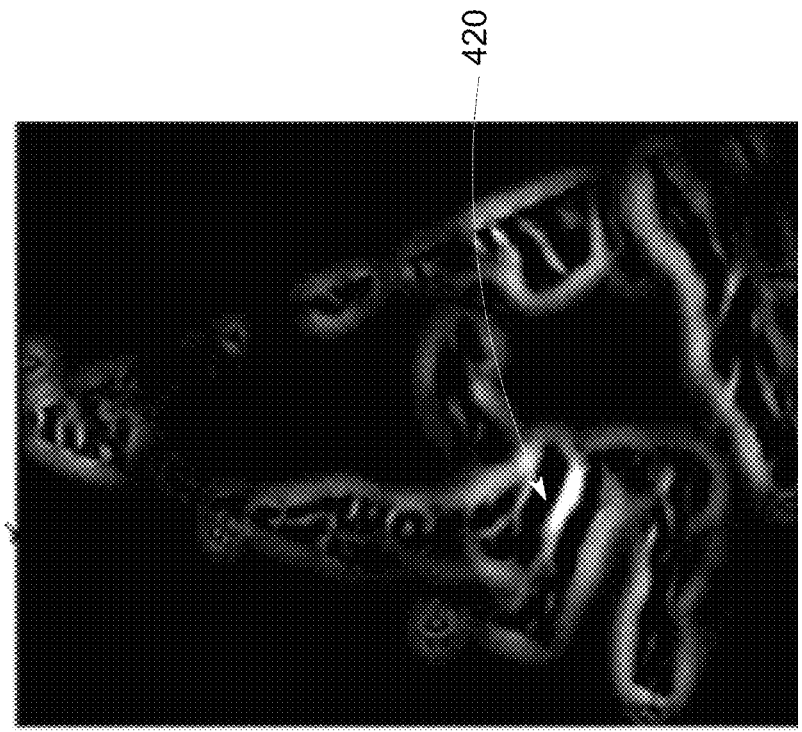
FIG. 4 (a) illustrates an image for edge-based object detection in accordance with an aspect of the disclosure.
Figure 4A:
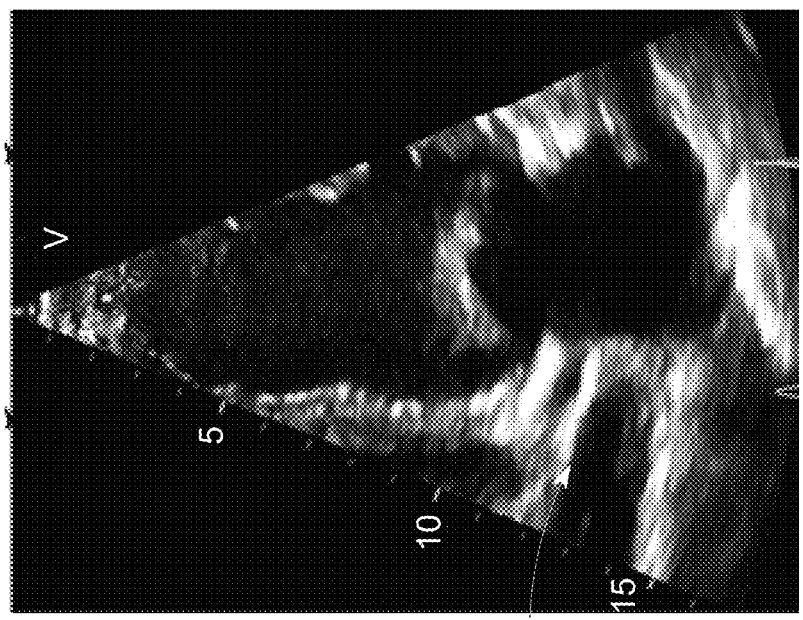

In accordance with the further aspect of the disclosure, the method 100 may comprise selecting 120 a task which is similar to the final imaging task. In one example, if the final task is segmentation of a cardiac image, different tasks related to segmentation of heart may be used alone or together to train the model. In one example, as shown in FIGS. 4 (*a*) and 4 (*b*) there are several edge-based object detection filters like Frangi vesselness, phase congruency filters that extract anatomical boundaries 410, 420 in ultrasound images and with careful tuning of scale space parameters, key edges may be extracted that define the object boundaries. Models pretrained for producing these feature-maps may provide an initial starting point for object detection or segmentation tasks.

The pre-task selection may be designed as a rule-based selection of the task appropriateness. The pre-task selection may depend on the expertise in traditional ways or computer vision ways of solving some of the medical imaging problems and the choice of task selection is predominantly driven by the choice of unsupervised methods one choses to solve the main task. In accordance with an aspect of the disclosure, different tasks may be used for example active contours, active shape models, or edge detection filters (Frangi vesselness, Phase congruency, difference of gaussian (DoG) etc), graph cuts etc. as unsupervised tasks that may provide initial results and may serve as pre-trained models.

Figure 5:
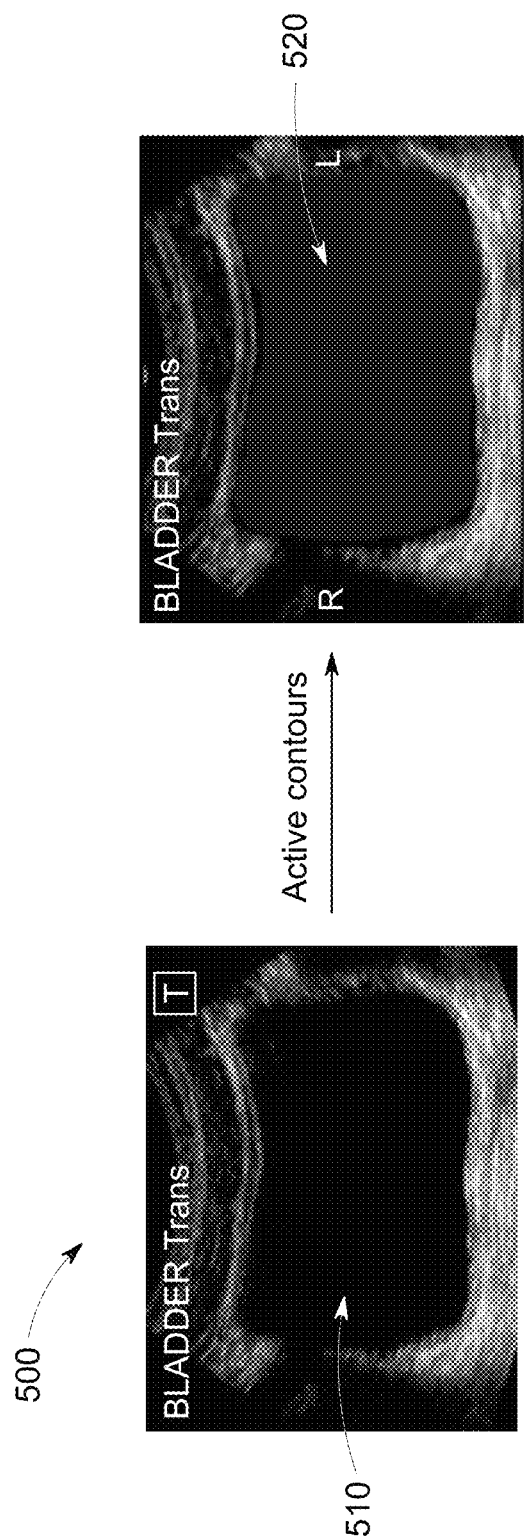
FIG. 5 illustrates extracting images corresponding dark region containing body fluids and use of active contours pre-task to extract the filled portion in accordance with an aspect of the disclosure.

Different pre-tasks may be used to extract different features depending on suitability of a pre-task to extract the particular features. For example, to extract the regions of the body that are filled with body fluids such as blood and water, pre-tasks like active contours may be used to for object segmentation and well suited for dark or bright object segmentation. FIG. 5 shows bladder 500 containing dark region 510 that may contain body fluids and active contours pre-task may be used to extract the region 520. In another example, domain specific pretext task selection for heart, key frames from the echocardiogram (ECG) images may be extracted. These frames may include images of the heart during different phase like diastolic, systolic and may be used for training the network to identify the images automatically. The models may learn representation of the data for classification tasks from these different heart images. The choice of task selection may be predominantly driven by the choice of unsupervised methods one choses to solve in the main task.

Figure 6:
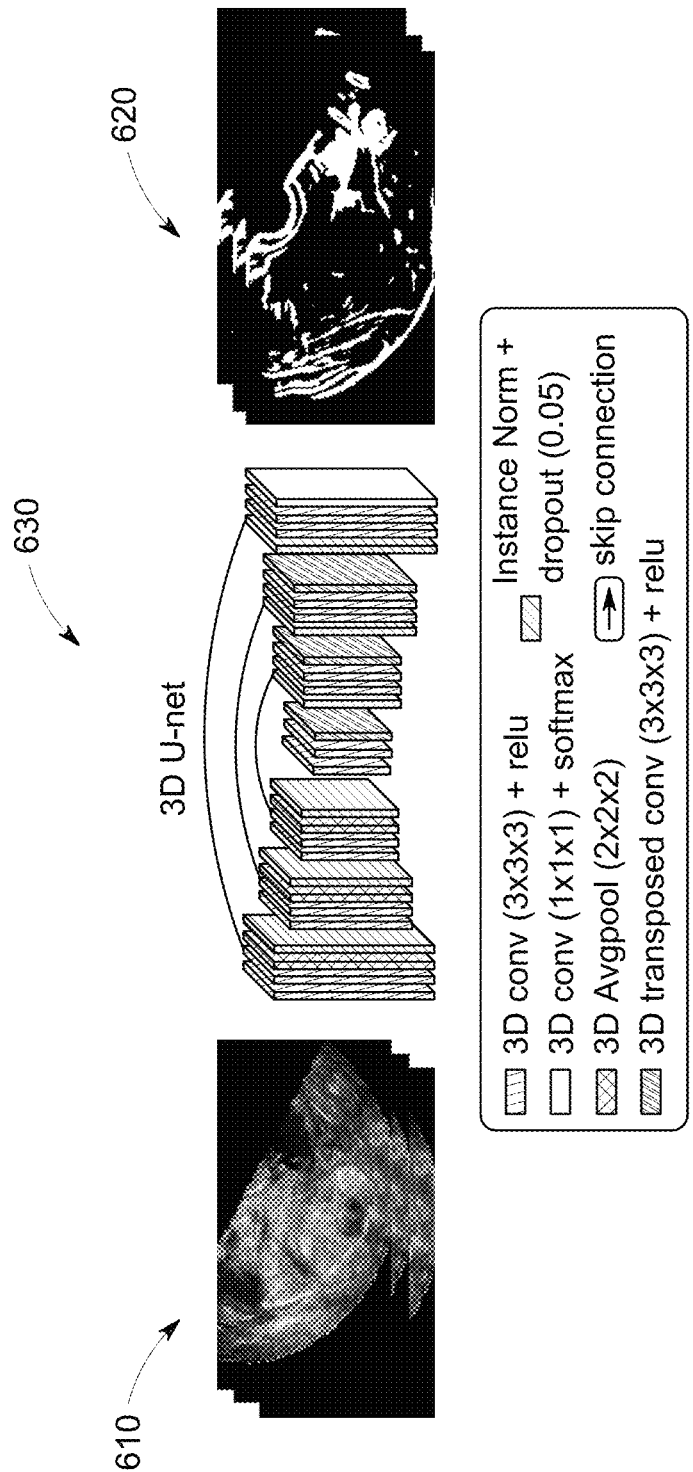
FIG. 6 illustrates use of difference of gaussian (DoG) architecture selector in accordance with an aspect of the disclosure.
Figure 7:
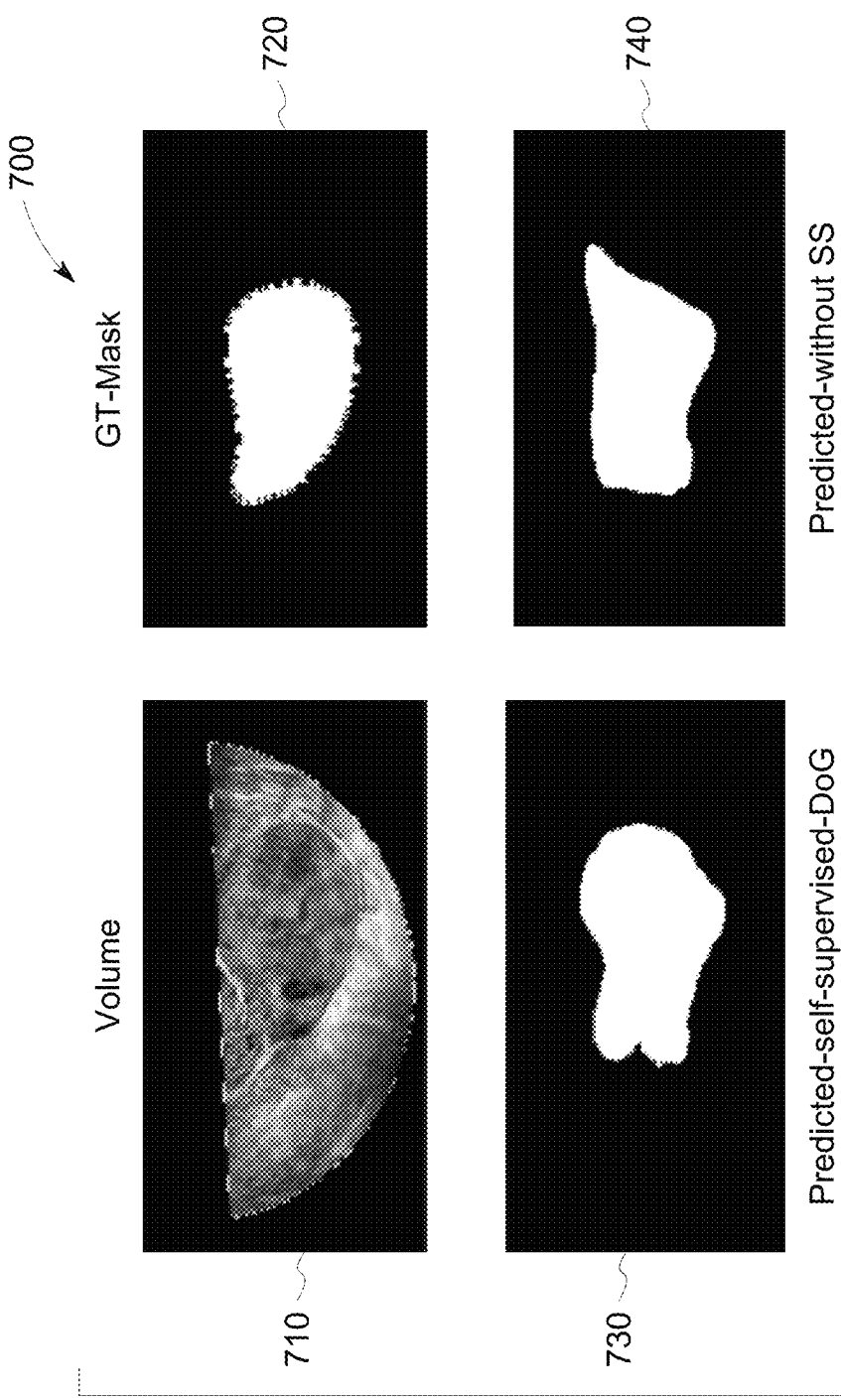
FIG. 7 illustrates Segmentation Results of Supervised Models using difference of gaussian (DoG) architecture selector in accordance with an aspect of the disclosure.

In accordance with an aspect of the disclosure, the method 100 further comprises selecting 130 a target problem specific architecture corresponding to a problem specific network architecture based on a user selection from available choices or any customized model as per user preference or as per the requirements of the final task. For example, if the final task is three-dimensional (3D) segmentation of an organ like heart or lungs, it may be difficult to get the three-dimensional image data of heart and use it to predict on target images. To overcome this challenge, an architecture pool containing various architectures may be used to pre-train the model. In one such non-limiting example, as shown in FIG. 6, self-supervised task was posed as the problem of predicting the difference of gaussian (DoG) output from the original image. DoG of the images used as GT were produced using traditional image processing methods. The DoG self-supervision task 630 when fine-tuned for the Ultrasound images gave a better segmentation output as compared to the traditional self-supervision tasks as well as the model trained without any pretraining. FIG. 7 shows a similar example 700 where difference of gaussian (DoG) self-supervision task when fine-tuned for the Ultrasound images 710 gave a better quality mask 720 and segmentation 730 output as compared to the traditional self-supervision tasks 740 as well as the model trained without any pretraining.

In accordance with an aspect of the disclosure, the method 100 further comprises generating 140 a pretrained model for the selected network architecture using the selected data obtained from the set of available data sets and a pretext task as obtained from domain specific pretext tasks. The method 100 may help create pretrained model for deep learning tasks. Some of the advantages that may be offered by the method 100 may include: 1. Ability to select pre-text task depending on the class of target task—segmentation, object detection as well as matching with other attributes of the task. 2. Ability to select an appropriate collection of datasets either based on keywords or based on measures of similarity in data distribution. 3. Ability to factor-in the deployment mode by selecting the appropriate architecture. This method 100 was tested on a 3D transvaginal uterus acquisitions by generating a 3D pretrained model on a handcrafted 3D U-net architecture with Difference of Gaussian based edge detector. With a small dataset of 44 volumes, the supervised task of uterus segmentation achieved 80% DICE overlap compared to 74% DICE without any supervision. Some of the further advantages may include: Obtaining the most appropriate set of network parameters for initializing a network for a task, Ability to improve model performance without supervision especially for a dataset with small number of labels and or a task with a small dataset, augmenting it with other similar datasets for the self-supervised task can lead to performance gains for the end task.

The experiment design strategy may comprise of the following steps: 1. Parsing: Parsing of query to identify keywords pertaining to the target task a. Identification of the task characteristics—segmentation, classification etc. b. Identification of the type of data—modality and anatomy c. Identification of restriction of data size or deployment mode. 2. Pre-Text Task Selection: Rule based selection of appropriate pre-text task. 3. Dataset Selection: Similarity matching between the target data and the data pool to determine the appropriate dataset(s) for use in the training process, in addition to the target dataset (if available). 4. Architecture selection(optional)—Based on the restriction on the model size, an appropriate model is chosen. 5. Self-supervised Training—Using the chosen architecture, pre-text task and data pool training is performed to obtain a pre-trained model.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable and include any computer program stored in memory for execution by devices that include, without limitation, mobile devices, clusters, personal computers, workstations, clients, and servers.

As used herein, the term "computer" and related terms, e.g., "computing device", "processor", "controller" are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

Figure 8:
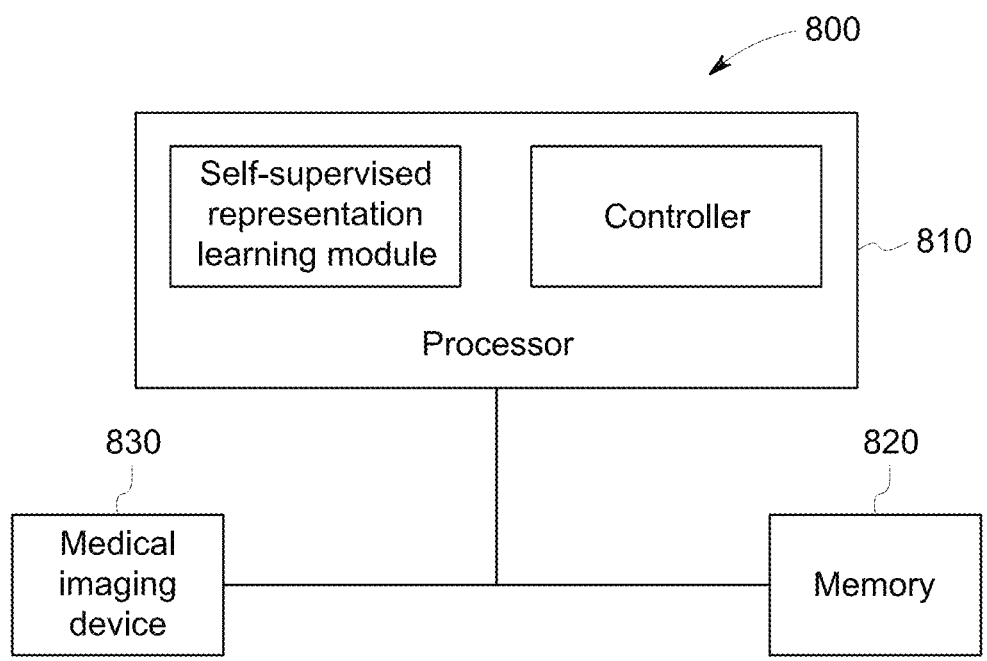
FIG. 8 illustrates system for chamber segmentation of a bladder in accordance with an aspect of the disclosure.

In accordance with an aspect of the disclosure, FIG. 8 shows a system 800 for self-supervised representation learning as a means to generate context-specific pretrained models. The system 800 may comprise encoded and executable instructions embodied in a tangible, non-transitory, computer readable medium, including, without limitation, a storage device and/or a memory device. Such instructions, when executed by a processor, cause the processor to perform at least a portion of the methods described herein. The system 800 may comprise a processor 810. The self-supervised representation learning as a means to generate context-specific pretrained models may be performed by a processor 810 that is connected to computer memory 820. The processor 810 may contain a self-supervised representation learning module configured to generate context-specific pretrained models. The processor 810 may contain a controller configured to execute the computer readable instructions to access the data from the computer memory 820. In another non-limiting example, the computer memory 820 may be part of the processor 810. The system 800 may comprise a medical imaging device 830 that may be configured to acquire images of the subject patient and send the images over network to the computer memory 820. In one example, the medical imaging device 830 may be an ultrasound imaging device, however, it is within scope of the disclosure to use any other medical imaging device including but not limited to X-ray, Computed tomography (CT), Magnetic resonance imaging device (MRI), and Positron emission tomography (PET). The computer memory 820 may contain a computer program for self-supervised representation learning as a means to generate context-specific pretrained models. The processor 810 may be configured to execute the computer program and generate context-specific pretrained models. The processor 810 may select data from a set of available data sets. Selecting 110 data from a set of available data sets may comprise identifying the data that is perceptually similar to the available data or the target data. This is a perceptual similarity-based approach of selecting the data. In another aspect, DICOM metadata may be used to generate the additional training data for the training model. In one example, this DICOM metadata may include two dimensional or three-dimensional image data of the similar organ obtained at a different acquisition setting. In another example, the selecting 110 data may include acquiring image data from similar anatomical organ or anatomical region as the target data.

The processor 810 may be further configured to select task which is similar to the final imaging task. In one example, if the final task is segmentation of a cardiac image, different tasks related to segmentation of heart may be used alone or together to train the model. The pre-task selection may be designed as a rule-based selection of the task appropriateness. The pre-task selection may depend on the expertise in traditional ways or computer vision ways of solving some of the medical imaging problems and the choice of task selection is predominantly driven by the choice of unsupervised methods one choses to solve the main task. In accordance with an aspect of the disclosure, different tasks may be used for example active contours, active shape models, or edge detection filters (Frangi vesselness, Phase congruency, difference of gaussian (DoG) etc), graph cuts etc. as unsupervised tasks that may provide initial results and can serve as pre-trained models.

Different pre-tasks may be used to extract different features depending on suitability of a pre-task to extract the particular features. For example, to extract the regions of the body that are filled with body fluids such as blood and water, pre-tasks like active contours may be used to for object segmentation and well suited for dark or bright object segmentation.

The processor 810 may be further configured to select a target problem specific network architecture based on a user selection from available choices or any customized model as per user preference. Selecting 130 a target problem specific network architecture corresponding to a problem specific network architecture based on a user selection from available choices or any customized model as per user preference or as per the final task. For example, if the final task is three-dimensional (3D) segmentation of an organ like heart or lungs, it may be difficult to get the three-dimensional data of heart and use it to predict on target images. To overcome this challenge, an architecture pool containing various architectures may be used to pre-train the model.

The processor 810 may be further configured to generate a pretrained model for the selected network architecture using the selected data obtained from the set of available data sets and a pretext task as obtained from domain specific pretext tasks. The processor 810 may help create pretrained model for deep learning tasks. Some of the advantages that may be offered by the method (100) may include: 1. Ability to select pre-text task depending on the class of target task—segmentation, object detection as well as matching with other attributes of the task. 2. Ability to select an appropriate collection of datasets either based on keywords or based on measures of similarity in data distribution. 3. Ability to factor-in the deployment mode by selecting the appropriate architecture.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for self-supervised representation learning as a means to generate context-specific pretrained models, the method comprising:
    selecting data from a set of available data sets;
    selecting a pretext task from a plurality of domain specific pretext tasks;
    selecting a target problem specific network architecture based on a user selection from available choices or any customized model as per user preference; and
    generating a pretrained model for the selected network architecture using the selected data obtained from the set of available data sets and the pretext task, wherein the selected data comprises DICOM metadata, and wherein the pretext task is related to an anatomy of a patient.

2. The method as claimed in claim 1, wherein model weights of the pretrained model are pre-trained on data similar in distribution to the target problem and the pretext task.

3. The method as claimed in claim 1, wherein the selecting the data from the set of available data sets comprises selecting the available data based on perceptual similarity.

4. The method as claimed in claim 3, wherein the selecting the data from the set of available data sets comprises selecting the data obtained from similar modality and similar acquisition settings.

5. The method as claimed in claim 1, wherein the selecting the data from the set of available data sets comprises selecting the data from other similar looking organs based on the echogenicity, uniformity and homogeneity of such similar organs.

6. The method as claimed in claim 1, wherein the selecting the pretext task from the plurality of domain specific pretext tasks comprises selecting the pretext task from a set of tasks similar to the target task.

7. The method as claimed in claim 1, wherein the pre-text task comprises active contours, active shape models, edge detection filters including frangi vesselness, phase congruency, and difference of gaussian as unsupervised tasks that serve as pre-trained models.

8. The method as claimed in claim 1, wherein the pre-text task comprises edge-based object detection filters including frangi vesselness and phase congruency for extracting anatomical boundaries in images and tuning of scale space parameters to extract key edges to define the object boundaries.

9. The method as claimed in claim 1, wherein the selecting the problem specific network architecture comprises using self-supervised pre-text tasks comprising difference of gaussian (DoG), Frangi vesselness, phase congruency, active contours, graph cuts for the ultrasound images segmentation output.

10. The method as claimed in claim 1, wherein domain specific pretext task selection for cardiac cycle comprises finding frames in a cardiac loop and training the network to identify the frames automatically for models to learn representation of the data for classification tasks.

11. A system comprising:
    at least one medical imaging device configured to acquire a plurality of medical images to generate at least one data set;
    a computer memory configured to store the at least one data set, pretext task and problem specific network architecture; and
    a computer processor comprising executable computer programs and configured to:
        select data from a set of available data sets;
        select a pretext task from a plurality of domain specific pretext tasks;
        select a problem specific network architecture based on a user selection from available choices or any customized model as per user preference; and
        generate a pretrained model for the selected network architecture using the selected data obtained from the set of available data sets and the pretext task, wherein the selected data comprises DICOM metadata, and wherein the pretext task is related to an anatomy of a patient.

12. The system as claimed in claim 11, wherein model weights of the pretrained model are pre-trained on data similar in distribution to a target problem and a target task.

13. The system as claimed in claim 11, wherein the selecting the data from the set of available data sets comprises selecting the data based on perceptual similarity.

14. The system as claimed in claim 13, wherein the selecting the data from the set of available data sets comprises selecting the data obtained from similar modality and similar acquisition settings.

15. The system as claimed in claim 11, wherein the selecting the data from the set of available data sets comprises selecting the data from other similar looking organs based on the echogenicity, uniformity and homogeneity of such similar organs.

16. The system as claimed in claim 11, wherein the selecting the pretext task from the plurality of domain specific pretext tasks comprises selecting the pretext task from a set of tasks similar to the target task.

17. The system as claimed in claim 11, wherein the pre-text task comprises active contours, active shape models, edge detection filters including frangi vesselness, phase congruency, and difference of gaussian graph cuts as unsupervised tasks that serve as pre-trained models.

18. A non-transitory computer-readable storage medium including instructions which, when executed, cause at least one processor to at least:
    select data from a set of available data sets;
    select a pretext task from a plurality of domain specific pretext tasks;
    select a problem specific network architecture based on a user selection from available choices or any customized model as per user preference; and
    generate a pretrained model for the selected network architecture using the selected data obtained from the set of available data sets and the pretext task, wherein the selected data comprises DICOM metadata, and wherein the pretext task is related to an anatomy of a patient.

19. The computer-readable storage medium as claimed in claim 18, wherein the selecting the data from the set of available data sets comprises selecting the data obtained from similar modality and similar acquisition settings, and wherein the selecting the data from the set of available data sets comprises selecting the data based on perceptual similarity.

20. The computer-readable storage medium as claimed in claim 18, wherein selecting the pretext task from the plurality of domain specific pretext tasks comprises selecting the pretext task from a set of tasks similar to the target task.

* * * * *